United States Patent [19]

Favreau et al.

[11] Patent Number: 5,353,187

[45] Date of Patent: Oct. 4, 1994

[54] SAFETY CIRCUITS FOR A TELEVISION RECEIVER

[75] Inventors: Jean C. Favreau, Tannheim, Fed. Rep. of Germany; Friedrich Meinertz, Singapore, Singapore; Chon S. Oh, Johore, Malaysia

[73] Assignee: Thomson Consumer Electronics S.A., Courbevoie, France

[21] Appl. No.: 768,726

[22] PCT Filed: Dec. 20, 1990

[86] PCT No.: PCT/EP90/02274

§ 371 Date: Oct. 11, 1991

§ 102(e) Date: Oct. 11, 1991

[87] PCT Pub. No.: WO91/10317

PCT Pub. Date: Jul. 11, 1991

[30] Foreign Application Priority Data

Dec. 22, 1989 [GB] United Kingdom ................ 8928999
Dec. 29, 1989 [DE] Fed. Rep. of Germany ....... 3943254

[51] Int. Cl.$^5$ .......................... H02H 3/20; H01J 29/56
[52] U.S. Cl. .......................... 361/91; 361/86; 361/87; 361/94; 315/388; 315/411; 348/377
[58] Field of Search .......................... 361/18, 91, 93, 86, 361/87; 315/379, 387, 388, 411; 358/190, 243, 245

[56] References Cited

U.S. PATENT DOCUMENTS

| | | | |
|---|---|---|---|
| 3,898,523 | 8/1975 | Wessel | 315/408 |
| 3,979,640 | 9/1976 | Fischman et al. | 315/387 |
| 4,042,858 | 8/1977 | Collette et al. | 315/379 |
| 4,343,028 | 8/1982 | Hicks | 361/91 |
| 4,965,496 | 10/1990 | Haferl | 315/371 |

FOREIGN PATENT DOCUMENTS 0332089 9/1989 European Pat. Off. .

OTHER PUBLICATIONS

"A New Horizontal Output Deflection Circuit" by P. L. Wessel, IEEE Transactions on Broadcast and Television Receivers, Aug. 1972, vol. BTR-18, No. 3, pp. 177-182.

"Low Power Consumption Drive for Wessel Horizontal Deflection System", by M. Fischman et al., IEEE Transactions on Consumer Electronics, vol. CE-21, No. 4, Nov. 1975, pp. 396-403.

"Selbstregelnde Transistor-Horizontalablenkschaltung für Farbportables" by U. Hartmann et al., Funkschau, 1977, vol. 18, pp. 97-104.

*Primary Examiner*—Todd DeBoer
*Attorney, Agent, or Firm*—Joseph S. Tripoli; Joseph J. Laks; Harvey D. Fried

[57] ABSTRACT

A first transformer is coupled to a deflection yoke and coupled to a derived secondary voltage source for driving a load, for example, for generating an ultor voltage. An on/off switch is responsive to an on/off signal. A second transformer has a primary winding coupled to the switch and coupled to a voltage source and has a secondary winding coupled to the first transformer. A first sampling circuit generates a first feedback signal indicative of current flowing from the secondary winding to the first transformer. A first safety circuit responsive to the first feedback signal controls the effect of the on/off signal on the switch when the current flowing from the secondary winding to the first transformer exceeds a threshold, by limiting the on time of the switch to limit the peak value of the current. A second sampling circuit generates a second feedback signal indicative of the ultor voltage. A second safety circuit responsive to the second feedback signal controls the effect of the on/off signal on the switch when the ultor voltage exceeds a threshold, for example due to picture tube internal arcing, by interrupting propagation of the on/off signal to block operation of the switch. A third sampling circuit senses current conducted by the switch and generates a third feedback signal. One of the first and second safety circuits is also responsive to the third feedback signal. The switch, the transformer and the deflection yoke can be coupled in a Wessel configuration.

28 Claims, 4 Drawing Sheets

SAFETY CIRCUITS FOR A TELEVISION RECEIVER

The invention relates to the field of protection circuits for television receivers, and in particular, to protection circuits for controlling power supply and deflection systems during overvoltage and overcurrent conditions.

Circuits for the generating operating voltages according to the principles of switched mode power supplies and resonant retrace circuits for generating line deflection currents and high voltage are subject to various overcurrent and overvoltage conditions. These conditions can be most troublesome when the power supply and line deflection circuits are combined in a Wessel configuration, wherein a single switching output stage controls both the switched mode power supply and the line deflection current generation.

A power supply and deflection system in a Wessel configuration can comprise a switching transistor, power supply and flyback transformers and a horizontal deflection yoke. The switching transistor is coupled to both the power supply transformer, the flyback transformer and the horizontal deflection yoke. The flyback transformer has a number of windings coupled to rectifying circuits for supplying various operating voltages to various loads in the television, for example dynamic loads. The ultor voltage, for example, can represent a very significant dynamic load. The power supply transformer has a primary winding coupled between the switching transistor and a DC voltage source. The power supply transformer also has a secondary winding, coupled to a winding of the flyback transformer by an energy transfer diode. An on/off control signal is generated by a regulator responsive to variations in one or more of the operating voltages, due to the varying loads and resulting energy losses. The switching transistor is responsive to the on/off control signal to replenish the dynamic load losses in the flyback transformer and to control horizontal deflection.

In a Wessel configuration, such a circuit is particularly endangered by overloading. Overloading can result from a number of sources, for example, through a defective component, due to a sudden scene change from dark to light with accompanying high beam current or from other overload causes. In such cases, it is easy to reach saturation of the transformer. High voltage peaks can occur in or across the switching transistor, which can destroy the transistor.

It is an aspect of the invention to provide safety protection s from a plurality of current and voltage overload conditions, by monitoring feedback signals indicative of different voltage and current levels in various parts of a switched mode power supply and line deflection system.

A power supply and deflection system for a television receiver according to this aspect of the invention comprises a first transformer coupled to a deflection yoke and coupled to a derived secondary voltage source for driving a load, for example, for generating an ultor voltage. An on/off switch is responsive to an on/off signal, for example a pulse width modulated signal. A second transformer has a primary winding coupled to the switch and coupled to a DC voltage source and has a secondary winding coupled to the first transformer. The source of DC voltage may be from a bridge rectifier coupled to an AC mains supply.

A first sampling circuit generates a first feedback signal indicative of current flowing from the secondary winding to the first transformer. The first sampling circuit may comprise a sampling resistance coupled between the secondary winding of the first transformer and a source of ground potential, and a circuit for rectifying the voltage developed across the resistance. A first safety circuit responsive to the first feedback signal controls the effect of the on/off signal on the switch when the current flowing from the secondary winding to the first transformer exceeds a threshold, by limiting the on time of the switch to limit the peak value of the current. The on time may be limited by effectively lowering the DC level of the on/off control signal.

A second sampling circuit generates a second feedback signal indicative of the ultor voltage. The second sampling circuit may comprise a rectifying circuit for developing a voltage proportional to the ultor voltage. A second safety circuit responsive to the second feedback signal controls the effect of the on/off signal on the switch when the ultor voltage exceeds a threshold, for example due to picture tube internal arcing, by interrupting propagation of the on/off signal to block operation of the switch. The second safety circuit may comprise a monostable electronic latch.

A third sampling circuit senses current conducted by the switch and generates a third feedback signal. The third sampling circuit can comprise a sampling resistance coupled in series with the switch, for example through the collector-emitter path of transistor switch, for developing a voltage level proportional to the current flowing through the transistor. One of the first and second safety circuits is also responsive to the third feedback signal.

The first safety circuit can have the same effect as would lowering the B+ voltage somewhat, to maintain the power supply and deflection system in an operating condition at a safe power consumption level until the overcurrent condition dissipates. The second safety circuit can completely interrupt operation of the power supply and deflection system for a period of time, having the same effect as would briefly turning off the television receiver, for example for a period of about five seconds.

It is another aspect of the invention to provide safety protection from a plurality of current and voltage overload conditions, by monitoring feedback signals indicative of different voltage and current levels in various parts of a switched mode power supply and line deflection system connected in a Wessel configuration.

A power supply and deflection system for a television receiver, in a Wessel configuration, includes an on/off switch responsive to an on/off signal, a first transformer having a primary winding coupled to the switch and coupled to a source of DC voltage and having a secondary winding, and a second transformer, having a first winding coupled to a deflection yoke, coupled to the secondary winding of the first transformer and coupled to the switch. According to this second aspect of the invention, a first sampling circuit generates a first feedback signal indicative of current flowing from the secondary winding of the first transformer to the first winding of the second transformer to replenish load losses. The first sampling circuit may comprise a sampling resistance coupled between the secondary winding of the first transformer and a source of ground potential, and a circuit for rectifying the voltage developed across the resistance. A first safety circuit responsive to the first feedback signal controls the effect of the on/off signal on the switch when the current flowing from the secondary winding to the first transformer exceeds a threshold, by limiting the on time of the switch to limit the peak value of the current. The on time may be limited by effectively lowering the DC level of the on/off control signal.

A second sampling circuit generates a second feedback signal indicative of a dynamic load on a derived secondary voltage source, for example the ultor voltage. The second sampling circuit may comprise a rectifying circuit for developing a voltage proportional to the ultor voltage. A second safety circuit responsive to the second feedback signal controls the effect of the on/off signal on the switch when the ultor voltage exceeds a threshold, for example due to picture tube internal arcing, by interrupting propagation of the on/off signal to block operation of the switch. The second safety circuit may comprise a monostable electronic latch.

A third sampling circuit senses current conducted by the switch and generates a third feedback signal. The third sampling circuit can comprise a sampling resistance coupled in series with the switch, for example through the collector-emitter path of transistor switch, for developing a voltage level proportional to the current flowing through the transistor. One of the first and second safety circuits is also responsive to the third feedback signal.

The first safety circuit can have substantially the same effect as would lowering the B+voltage somewhat, to maintain the power supply and deflection system in an operating condition at a safe power consumption level until the overcurrent condition dissipates. The second safety circuit can completely interrupt operation of the power supply and deflection system for a period of time, having the same effect as would briefly turning off the television receiver, for example for a period of about five seconds.

It is still another aspect of the invention to provide safety protection from a plurality of current and voltage overload conditions, by monitoring feedback signals indicative of different voltage and current levels in various parts of a switched mode power supply and line deflection system, wherein different overvoltage or overcurrent conditions on the secondary side of a transformer result in different operational responses from respective safety circuits. A power supply for a television according to this aspect of the invention comprises a transformer having a plurality of windings and an on/off switch responsive to an on/off signal for enabling conduction an energizing current through a first one of the windings. A first sampling circuit for generates a first feedback signal indicative of the energizing current through the first one of the windings. A first safety circuit is responsive to the first feedback signal for controlling the effect of the on/off signal on the switch in a first manner when the energizing current exceeds a threshold. A rectifying circuit is coupled to another one of the windings for generating a voltage source for driving a dynamic load, for example the ultor voltage for a cathode ray tube. A second sampling circuit generates a second feedback signal indicative of the dynamic load. A second safety circuit is responsive to the second feedback signal for controlling the effect of the on/off signal on the switch in a second manner when the ultor voltage exceeds a threshold. The first safety circuit, responsive to said first feedback signal, controls the effect of the on/off signal on the switch in the first manner by limiting the on time of the switch to limit the peak value of the energizing current through the first one of the windings. The second safety circuit, responsive to said second feedback signal, controls the effect of the on/off signal on the switch in the second manner by interrupting propagation of the on/off signal to block operation of the switch.

The first safety circuit can have substantially the same effect as would lowering the B+ voltage somewhat, to maintain the power supply and deflection system in an operating condition at a safe power consumption level until the overcurrent condition dissipates. The second safety circuit can completely interrupt operation of the power supply and deflection system for a period of time, having the same effect as would briefly turning off the television receiver, for example for a period of about five seconds.

It is yet another aspect of the invention to provide safety protection from a plurality of current and voltage overload conditions, by monitoring feedback signals indicative of different voltage and current levels in various parts of a switched mode power supply and line deflection system, wherein different overvoltage or overcurrent conditions on the primary and secondary sides respectively of a transformer result in different operational responses from respective safety circuits.

A power supply for a television according to this aspect of the invention comprises a primary side and a plurality of secondary side transformer windings. An on/off switch is responsive to an on/off signal for enabling conduction an energizing current through the primary side winding to supply energy to the secondary side windings. A first sampling circuit generates a first feedback signal indicative of current through the switch, for example the current flowing through the collector-emitter junction of a switching transistor. A first safety circuit is responsive to the first feedback signal for controlling the effect of the on/off signal on the switch in a first manner when current conducted by the switch exceeds a threshold. A rectifying circuit is coupled to one of the secondary side windings for developing a voltage source for driving a load. A second sampling circuit generates a second feedback signal indicative of an energy replenishing current flowing in one of the secondary side windings. A second safety circuit is responsive to the second feedback signal for controlling the effect of the on/off signal on the switch in a second manner when the energy supplied to the secondary side windings exceeds a threshold. The first safety circuit, responsive to said first feedback signal, controls the effect of the on/off signal on the switch in the first manner by interrupting propagation of the on/off signal to block operation of the switching means. The second safety circuit, responsive to said second feedback signal, controls the effect of the on/off signal on the switch in the second manner by limiting the on time of the switch to limit the peak value of the energy replenishing current.

The first safety circuit can completely interrupt operation of the power supply and deflection system for a period of time, having the same effect as would briefly turning off the television receiver, for example for a period of about five seconds. The second safety circuit can have substantially the same effect as would lowering the B+ voltage somewhat, to maintain the power supply and deflection system in an operating condition at a safe power consumption level until the overcurrent condition dissipates.

It is yet another aspect of the invention to provide power supply and deflection systems having safety protection circuits for various over voltage and over current conditions, which circuits can act swiftly, even in response to brief or sudden overload conditions. Accordingly, the various sampling circuits and safety circuits operate with a sufficiently short time constant to enable altering the effect of the on/off signal on the switch essentially without delay during an overload condition. The safety circuits can respond, for example, within a time interval of approximately several horizontal line scanning periods.

The invention is founded on the following considerations, which are explained in the context of a switched mode power supply and deflection system in a Wessel configuration, wherein the occurrence of certain overload conditions can be more likely. Power is transferred into the primary winding of the power supply transformer during conduction of the switch. This power is transferred to the secondary winding of the power supply transformer when the switch stops conducting. The power is than transferred to a winding of the flyback transformer, through the energy transfer diode. The amount of energy transferred will depend upon lead losses in the flyback transformer. The horizontal deflection circuit is one such lead, although the horizontal deflection circuit is a relatively constant lead, which can be accounted for in the original design and operating parameters. Other loads can be dynamic, and cannot be predicted as well in advance. Moreover, such dynamic loads can also result from fault conditions, such as failure of various components. A significant dynamic load results from generation of the ultor voltage for the cathode ray tube In a typical kind of overload situation, the power taken from the power supply transformer increases too severely. Power fed from the power transformer to the deflection transformer through the energy transfer diode likewise climbs unacceptably. The current in the secondary winding of the power supply transformer, which feeds the energy transfer diode, also increases in turn. In accordance with aspects of the invention this current is measured, for example by means of a sampling resistor, coupled between the secondary winding and ground. The voltage drop across the resistor is a measure of the current flowing from the first transformer to the second transformer, and consequently, a measure of the power conducted from one transformer to the other to replenish load losses. It is for this reason that the voltage drop can be used as a corrective variable, or feedback signal, for triggering a first protective safety circuit. The resistor has practically no influence on the function of the circuit itself, because it can have a very low resistance, for example 1 ohm or less.

According to a further aspect of the invention, the first safety circuit operates in tandem with other safety circuits, for example one which monitors the ultor voltage by sampling the heater voltage for the cathode ray tube. A second corrective variable, or feedback signal, is developed by rectifying the heater voltage, which is used in addition to the first corrective variable for triggering the same, or another protective circuit. This solution is advantageous because the winding for deriving the heating voltage for the picture tube generally has a fixed coupling with the remaining windings of the transformer, and for that reason, registers an overload condition reliably and quickly. Both the amount of the energy transferred into the second transformer and the amplitude of the impulse voltage at the second transformer can be measured by simultaneously evaluating the energy transferred from the power supply transformer to the flyback transformer and the voltage amplitude in the flyback transformer. The energy transferred from the power supply transformer to the deflection transformer is evaluated by monitoring the first corrective variable. The voltage amplitude in the deflection transformer is evaluated by monitoring the second corrective variable. Either or both corrective variables can be utilized for triggering the same or respective protection circuits in the event of overload conditions.

The first and second safety circuits can operate in tandem with a third overload detection circuit which senses current conducted by the switch, for example by another sampling resistor in series with the switch. The voltage across the resistor is indicative of the current conducted by the switch. A feedback signal related to this voltage can trigger operation of a protection circuit to interrupt operation of the deflection and power supply system. The protection circuit can be independent of those responsive to the first and second corrective variables, or can be one of the same protection circuits.

The time constant of the circuits in the paths of the first and second corrective variables is, advantageously, of such a small value that the protective circuits are made to operate practically without delay. The protective circuits can be actuated, for example, after only a few video lines, if in these video lines a temporary overload condition occurs, for example through a bright picture spot.

FIGS. 1(a) and 1(b) together illustrate a portion of a circuit for a television receiver illustrating aspects of the invention. Lines in the two FIGURES which connect to one another are denoted by the same upper case reference letters. All capacitances are in farads and EC equals 16 volts unless otherwise noted. All resistances are in ohms, ¼ watt, unless otherwise noted. The values of components correspond to an AC mains supply of 220–240 volts. The circuit configuration is the same for an AC mains supply of 110–120 volts, although some of the component values will be different.

Figure 1A:
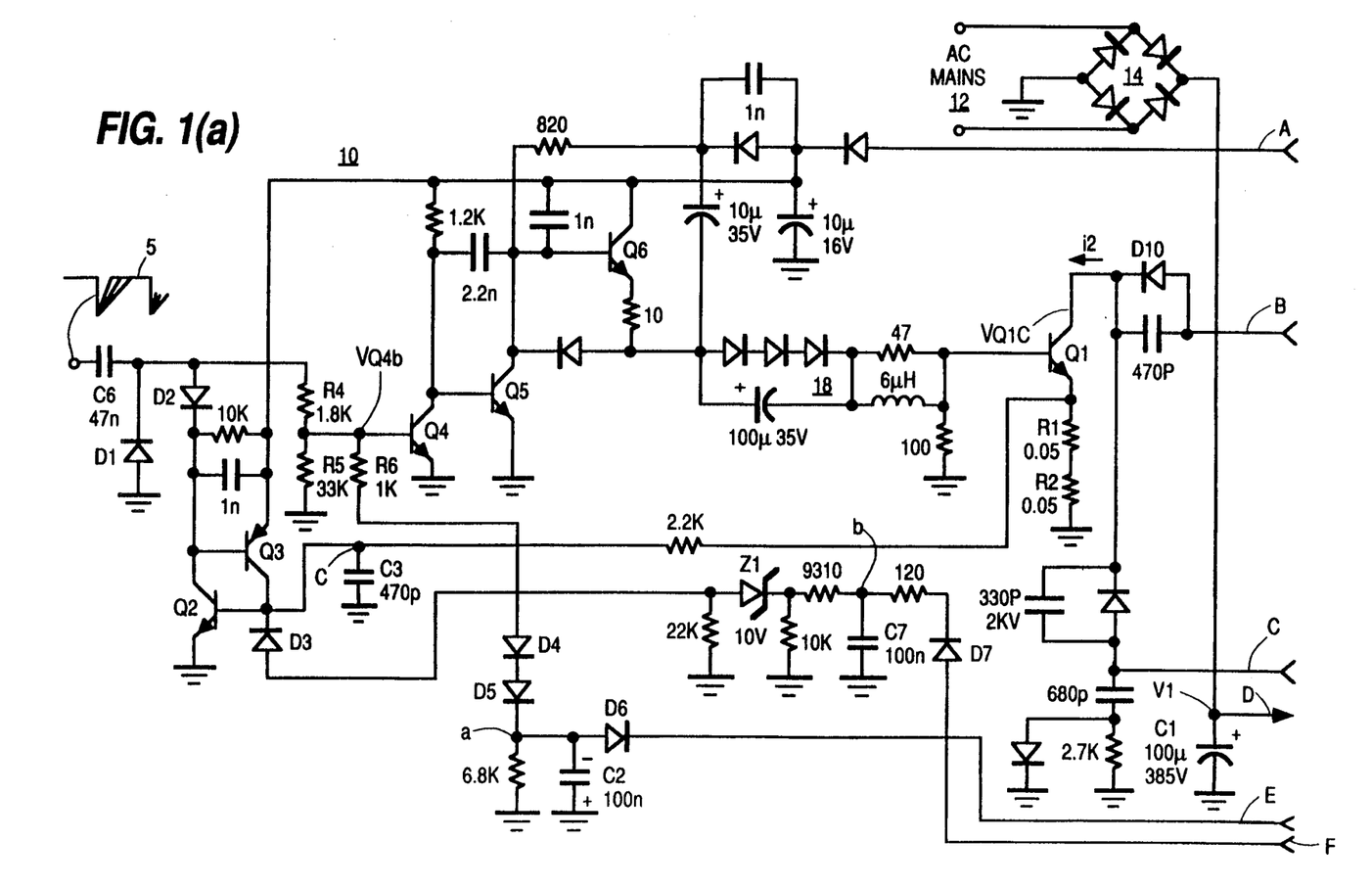
Figure 1B:
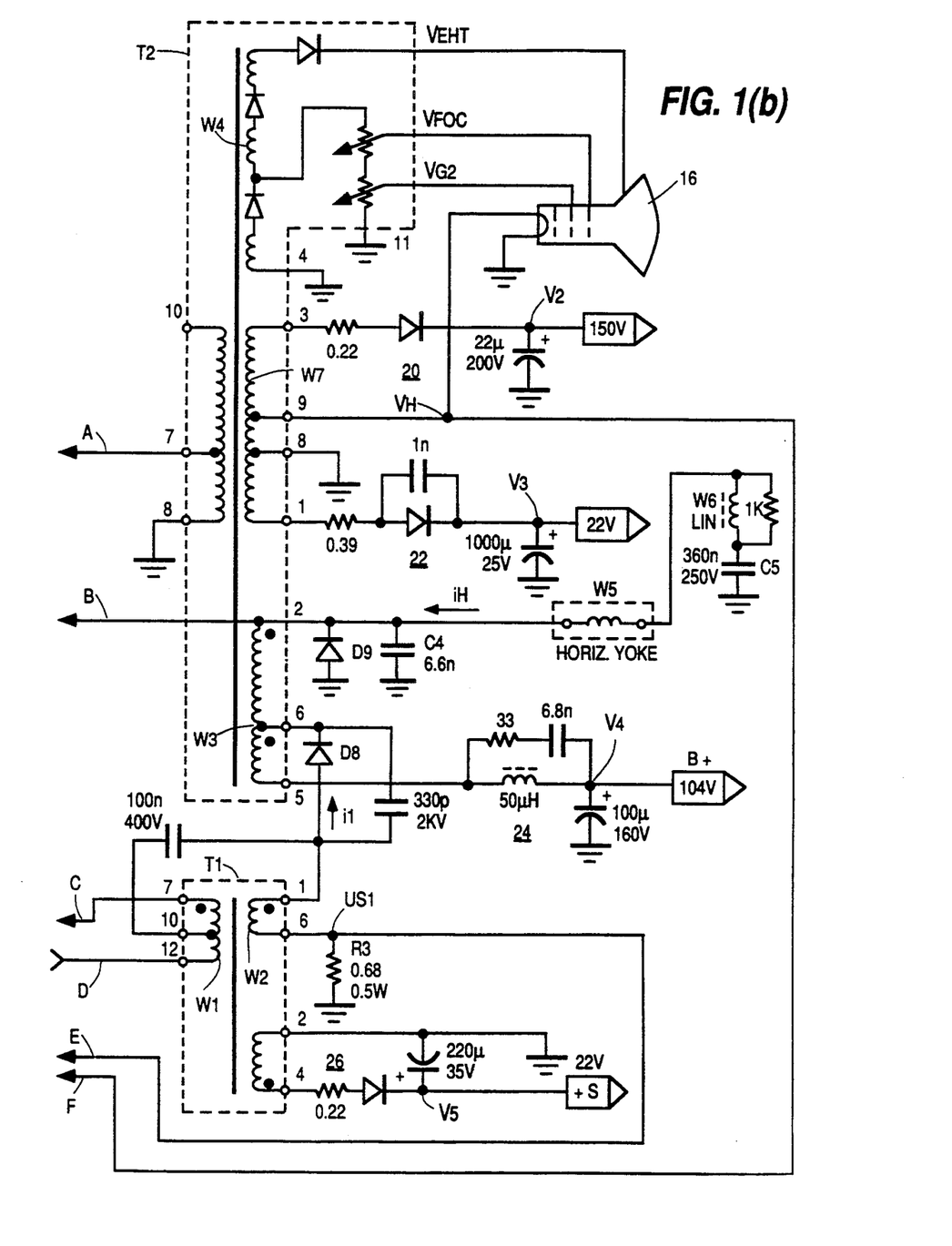

A power supply and deflection circuit 10 shown in FIGS. 1(a) and 1(b) embodies a Wessel configuration. Briefly, the output stage transistor in a Wessel circuit operates with an unstabilized input voltage source, and draws from the input voltage source only as much power is required to maintain regulated supply voltages or a constant deflection current. The conduction time of the horizontal output transistor is regulated to maintain constant deflection current independently of fluctuations of input voltage and loads on the regulated voltage supplies.

In the configuration of a Wessel circuit, the horizontal output stage is essentially horizontal output transistor Q1. Horizontal output transistor Q1 drives both the power supply transformer and the flyback transformer. Transistor Q1 is coupled to the horizontal yoke W5, the flyback transformer T2 and the power supply transformer T1. An input voltage V1 is generated at the filter capacitor C1 by the diode bridge rectifier circuit 14 from the AC mains power supply at the terminals 12. The voltage V1 is coupled to tap 12 of the primary winding W1 of the transformer T1 and applied to the transistor Q1, which acts as a power switch.

The secondary winding W3 of transformer T2, retrace capacitor C4 and damper diode D9 are coupled across the collector to emitter junction of the switching transistor Q1 by a first diode D10, poled for conduction in the same direction as the collector to emitter junction. The secondary winding W2 of the transformer T1 is connected with the winding W3 of the transformer T2 through the energy transfer diode D8, poled to conduct and transfer energy from the primary winding to the deflection winding during the retrace interval.

The first half of the retrace interval is the time during which the retrace capacitor C4 is charged by energy in the retrace pulse flowing from the horizontal yoke W5. The retrace capacitor C4 is fully charged at the middle of retrace, when the deflection current is zero. Current flows from the retrace capacitor C4 back through the horizontal yoke W5 during the second half of retrace into the linearity capacitor C5. Retrace ends when the voltage across the retrace capacitor C4 reaches zero, and the damper diode D9 conducts. The damper diode D9 conducts until the deflection current reaches zero. Thereafter, the damper diode D9 turns off. Transistor Q1 will start conducting some time before the deflection current reaches zero, but not after, depending upon the extent of load losses. As the deflection current exceeds zero, the diode D10 becomes forward biased. This is possible because transistor Q1 will already be conducting for the power supply function, and the cathode of diode D10 will be only slightly above ground.

The start of conduction by transistor Q1 will not affect the deflection current, whereby regulation of the power supply function is independent of deflection. Conduction of the deflection current iH through diode D10 and transistor Q1 continues until transistor Q1 is turned off, which initiates retrace. The switching transistor Q1 is periodically controlled to be conducting and blocked by the pulsewidth modulating periodic voltage signal 5, shown in FIG. 2(a). The signal 5 is AC coupled by capacitor C6, clamped by diode D1 and adjusted in amplitude by the voltage divider formed by resistors R4 and R5. The on/off pulse width modulating signal is coupled to the horizontal output stage by transistors Q4, Q5 and Q6, which serve as driving stage, and by the bias voltage network 18. The bias level for signal 5 at the base of transistor Q4 may be modified by conduction of diodes D4 and D5. Diodes D4 and D5 are nonconductive under normal operating conditions.

The transformer T2 contains a high voltage winding W4 which, by means of rectifiers, generates the high voltage VEHT, the focus voltage VFOC and the screen-grid voltage VG2 for the picture tube 16. The secondary winding W3 feeds the line deflection coil W5 which is grounded via the linearity adjuster W6. Various rectifying circuits 20, 22, 24 and 26 develop operating voltages V2, V3, V4 and V5 respectively, from the secondary windings of the transformers T1 and T2. The pulse width of the voltage signal 5 is modulated, by standard circuitry not shown, in such a way that the operating (switch-on) time of the transistor Q1 is regulated to stabilize the operating voltages V2–V5.

The base of the secondary winding W2 is not grounded as usual but connected to ground through a sampling resistor R3. The energy stored in the transformer T1 is conducted in the form of a current i1 through the energy transfer diode D8 to the transformer T2, and serves to replenish the power loss. The current i1 generates a negative voltage corrective variable US1 at the resistor R3. The corrective variable US1 is rectified by diode D6 and appears at point 'a' in the form of a direct voltage dependent on the current i1. Above a threshold value voltage determined by the sum of the forward bias voltages of diodes D4 and D5, this negative direct voltage is coupled through resistor R6 from point 'a' to the base of the transistor Q4 to reduce the bias level, or DC level at the base of transistor Q4. This has the effect of reducing the on time of transistor Q4, which in turn reduces the on time of transistor Q1. Reducing the on time of transistor Q1 limits the peak current i2 conducted by transistor Q1 and limits the energy transferred through diode D8. The on time of transistor Q1 is reduced as long as the energy limiting safety circuit is active. The on time of transistor Q1 remains restricted as long as the bias level of signal 5 is effected by the conduction of diodes D4 and D5. Overload protection for the circuit 10 in general, and in particular for the transistor Q1, is thereby achieved. This protective circuit, or energy limiter, is actuated essentially without any delay, as the capacitor C2 is sized appropriately small, having a value of about 100 nF. The protective circuit acts quickly even in cases where the overload exists only during several lines of the television picture, for example, during a transition from a dark picture to a bright picture.

Figure 2A:
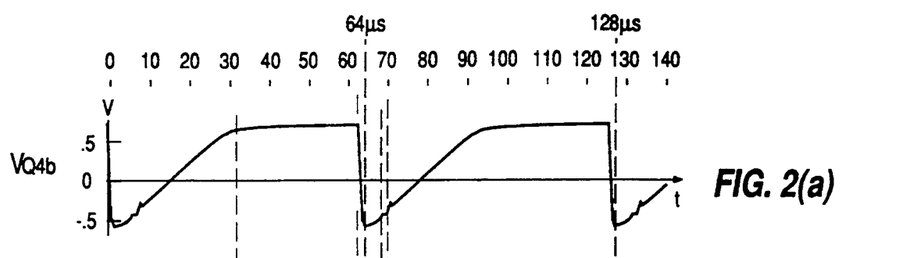
FIGS. 2(a)–2(e) are waveforms useful for explaining operation of the circuit shown in FIG. 1 under normal operating conditions.
Figure 2B:
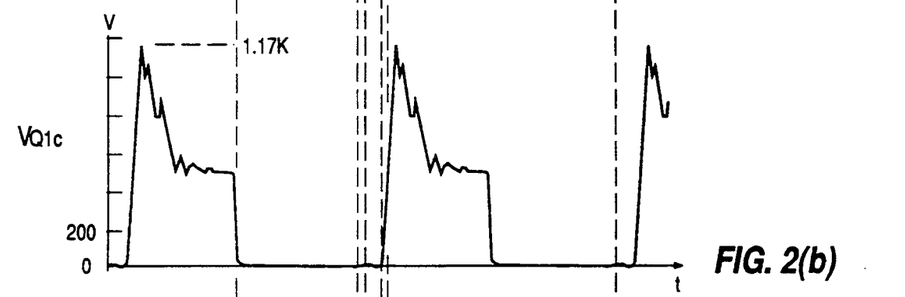
Figure 2C:
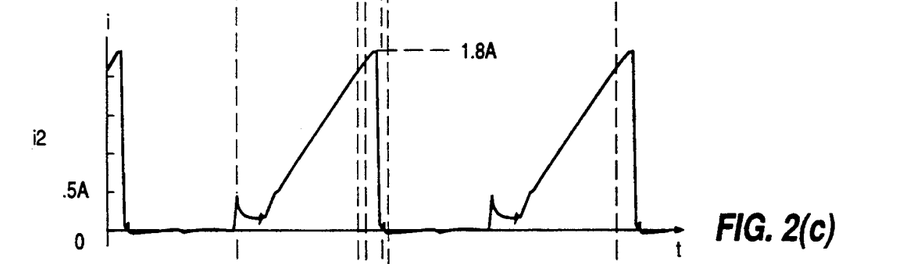

The operation of the protective circuit responsive to the corrective variable US1 can be further understood by reference to the representative waveforms shown in FIGS. 2(a)–2(e). The instant at which transistor Q1 turns on will vary with the slope of the leading edge of signal 5. Signal 5 is AC coupled by capacitor C6 and reduced in amplitude by voltage divider, formed by resistors R4 and R5, to define a voltage VQ4b at the base of transistor Q4. Voltage VQ4b is shown in FIG. 2(a). More directly, the slope determines the turn on instant of transistor Q4, by altering the time needed to reach a voltage level high enough to forward bias the base emitter junction of transistor Q4. Transistor Q5 is turned off when transistor Q4 turns on. Transistor Q6 is turned on when transistor Q5 turns off, and supplies base drive to transistor Q1. The voltage VQ1c at the collector of transistor Q1 is shown in FIG. 2(b). The voltage VQ1c falls substantially to ground when transistor Q1 begins conducting at time t1. At the same time, an upramping current i2 flows through winding W1 and through transistor Q1 to ground, through sampling resistors R1 and R2. Transistor Q1 turns off at time t3, shortly after transistor Q4 is turned off at the end of each pulse in signal 5 at time t2. The capacitor in network 18 helps to rapidly deplete the base charge of transistor Q1 through transistor Q5, which turns on when transistor Q4 turns off. The time needed to deplete the base charge and turn transistor Q1 off is approximately 6 microseconds.

Figure 2D:
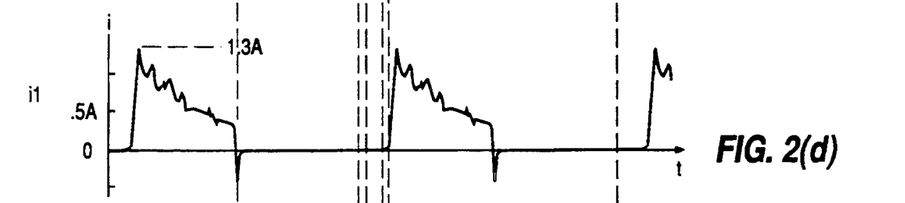
Figure 2E:
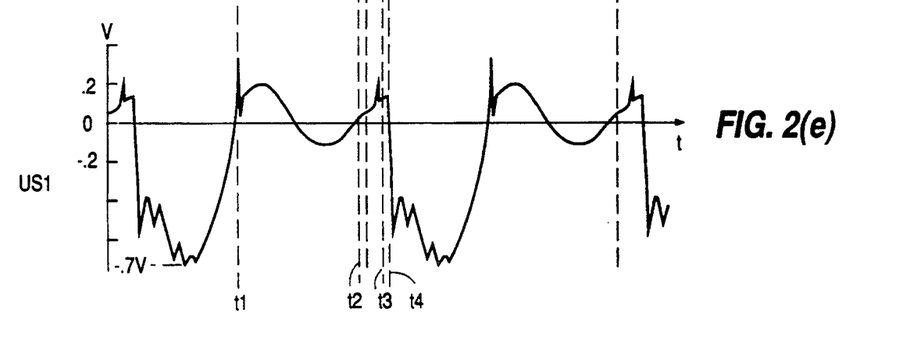

Immediately after transistor Q1 turns off, and current i2 stops flowing, a reverse e.m.f. in winding W1 induces a current i1 to begin in winding W2 at time t4, as shown in FIG. 2(d). Current i1 flows through diode D8 into winding W3. Current i1 also starts to flow through resistor R3 at time t4, developing the feedback signal US1, shown in FIG. 2(e). Feedback signal US1 is characterized by a negative excursion having an amplitude related to the amount of current i2 flowing through diode D8. Signal US1 is rectified by diode D6 and establishes a negative control voltage level across capacitor C2, at point a.

Figure 3A:
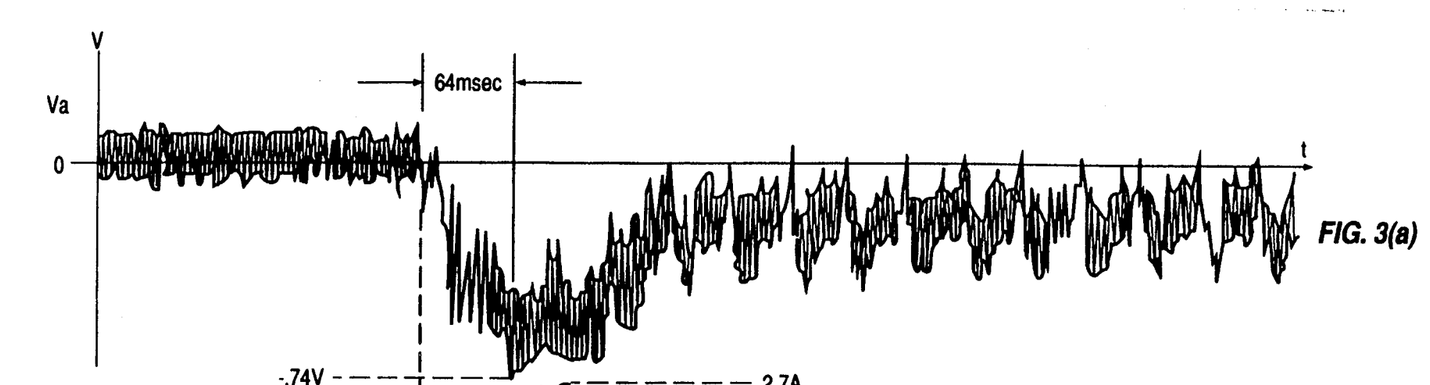
FIGS. 3(a)–3(b) are waveforms useful for explaining operation of the circuit shown in FIG. 1 under an overload condition.
Figure 3B:
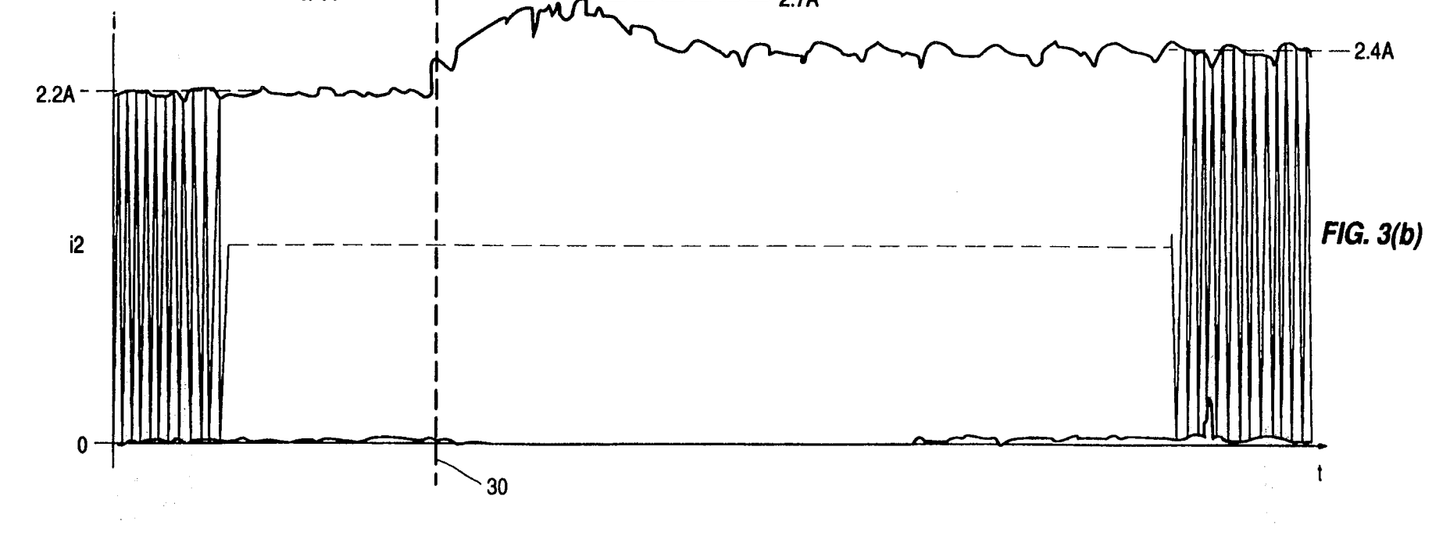

FIGS. 3(a) and 3(b) illustrate how the energy limiter of the circuit described above responds to an overload current condition. The time scale of the waveforms in FIG. 3 is compressed compared to the waveforms of FIG. 2. FIG. 3 includes a time interval of approximately 64 milliseconds. The same scale interval in FIG. 2 represents approximately 20 microseconds. The amount of current i1 is related to the amount of current i2, conducted by transistor Q1, as illustrated in the waveforms of FIG. 2. Current i2 is shown in FIG. 3(a). A vertical dashed line 30 marks a boundary between a dark picture with essentially zero beam current loading, to the left, and a 100% white picture with essentially maximum beam current loading, to the right. The average peak amplitude of current i2 during the black picture is approximately 2.2 amps. The voltage Va at the cathode of diode D5 is shown in FIG. 3(b), both before and after the transition marked by line 30. The average voltage level of voltage Va during the black picture is approximately zero volts, that is, ground.

After the transition to a white picture, the average peak amplitude of current i2 increases. At the same time, the level of voltage Va becomes more negative as current i1 increases with current i2. It can be seen from FIG. 2(a) that the maximum amplitude of VQ4b is approximately 0.8 volts. This is more than is needed to turn on transistor Q4. Voltage Va becomes more negative as the average peak amplitude of current i1 increases with current i2 during successive bright white horizontal lines. Very soon after the transition, voltage Va becomes negative enough to forward bias diodes D4 and D5. This can occur after only a few horizontal scanning periods. The base of transistor Q4 will be pulled lower, requiring a higher level of voltage VQ4b to turn on transistor Q4. The on time of transistor Q4 will be delayed, and therefore reduced, and the on time of transistor Q1 will be likewise reduced. This prevents current i2 from rising above approximately 2.7 amps. for the duration of the overload condition and prevents current i1 from rising further as well. The maximum effect of the limiting action occurs after approximately 64 milliseconds, corresponding to between two and three successive fields.

Voltage Va begins rising as the average peak amplitude of current i1 decreases with current i2. If the condition persists, the receiver can continue to operate, but at a lower power level than the maximum allowable level. The lower power level is represented by the current level of approximately 2.4 amps. This is equivalent, in many respects, to slightly lowering the input voltage which is switched by transistor Q1. Diodes D4 and D5 eventually become nonconductive as voltage Va rises, restoring the normal bias level to the base of transistor Q4. The circuit returns to normal operation.

Another protective circuit is associated with transformer T2, which supplies the heating voltage VH for the picture tube 16. The heating voltage VH is rectified by the diode D7 and fed to the base of transistor Q2 and collector of transistor Q3 through the Zener diode Z1 and the diode D3. If the impulse voltage at the transformer T2 increases then VH also increases, and therewith, the rectified voltage across capacitor C7 present at point 'b'. Zener diode Z1 becomes conductive above a threshold value, so that the positive voltage at point 'b' is coupled to the base of transistor Q2, which becomes conductive. Conduction of transistor Q2 turns on transistor Q3. Transistors Q2 and Q3 form a latch, in the nature of an SCR. When the latch is active, the voltage signal 5 is suppressed by the effect of diodes D2 and D3. Triggering of transistor Q1 is prevented. The latch releases when the impulse overload signal falls low enough for the Zener diode to turn off. Consequently, protection for the entire circuit is also achieved during any occurrence of an unacceptably high impulse voltage at the transformers T1 or T2.

A third protective circuit is also provided for sensing the current i2 through diode D10 and transistor Q1. Emitter current from transistor Q1 is directly sensed by sampling resistors R1 and R2. The voltage across the sampling resistors is developed at point 'c', at charging capacitor C3. The voltage at point 'c' is another input to the base of transistor Q2 which forms part of the latch circuit described above. If the current i2 flowing into transistor Q1 becomes too large then the voltage at point 'c' becomes correspondingly more positive. When the voltage is large enough, transistor Q2 becomes conductive and enables operation of the latch to effectively switch off the voltage signal 5.

Consequently, the entire circuit provides overload protection in several respects. One is based on the current i1 through the diode D8 being too high, and causing an overload signal at point 'a'. A second is based on the impulse voltage from transformers T1 or T2 being too high, and causing an overvoltage signal at point 'b'. A third is based on the current i2 through transistor Q1 being too high, and causing an overload signal at point 'c'.

What is claimed is:

1. A power supply and deflection system for a television receiver, comprising:
   a first transformer coupled to a deflection yoke and coupled to means for driving a load;
   on/off switching means responsive to an on/off signal;
   a second transformer having a primary winding coupled to said switching means and couple to a source of DC voltage and having a secondary winding coupled to said first transformer;
   sampling means for generating a first feedback signal indicative of current flowing from said secondary winding to said first transformer; and
   first control means responsive to said first feedback signal for controlling the effect of said on/off signal on said switching means when said current flowing from said secondary winding to said first transformer exceeds a threshold.

2. The system of claim 1, wherein said first control means limits the on time of said switching means to limit the peak value of said current flowing from said secondary winding to said first transformer.

3. The system of claim 1, comprising unidirectional conducting means for coupling said secondary winding to said first transformer.

4. The system of claim 1, wherein said first transformer has a winding couple to said secondary winding and coupled to said deflection yoke.

5. The system of claim 1, further comprising:
   a derived secondary supply for generating an ultor voltage for a cathode ray tube energized by said means for driving a load;
   means for generating a second feedback signal indicative of said ultor voltage; and, second control means responsive to said second feedback signal for controlling the effect of said on/off signal on said switching means when said ultor voltage exceeds a threshold.

6. The system of claim 5, wherein said second control means interrupts propagation of said on/off signal to block operation of said switching means.

7. The system of claim 5, further comprising means for sensing current conducted by said switching means and generating a third feedback signal, one of said first and second control means also being responsive to said third feedback signal.

8. The system of claim 1, further comprising:
means for sensing current conducted by said switching means and generating a second feedback signal; and,
second control means responsive to said second feedback signal for controlling the effect of said on/off signal on said switching means when said current conducted by said switching means exceeds a threshold.

9. The system of claim 8, wherein said second control means interrupts propagation of said on/off signal to block operation of said switching means.

10. The system of claim 1, wherein said first control means controls the effect of said on/off signal on said switching means within a time interval on the order of several horizontal scanning periods.

11. The system of claim 1, wherein said switching means is also coupled to said first transformer and coupled to said deflection yoke.

12. The system of claim 7, wherein said switching means is also coupled to said first transformer and coupled to said deflection yoke.

13. The system of claim 1, wherein said first control comprises a diode for determining said threshold.

14. A power supply and deflection system for a television receiver, comprising:
a Wessel configuration, having:
on/off switching means responsive to an on/off signal;
a first transformer having a primary winding coupled to said switching means and coupled to a source of DC voltage and having a secondary winding; and,
a second transformer, having a first winding coupled to a deflection yoke, coupled to said secondary winding of said first transformer and coupled to said switching means;
sampling means for generating a first feedback signal indicative of current flowing from said secondary winding of said first transformer to said first winding of said second transformer to replenish load losses; and,
first control means responsive to said first feedback signal for controlling the effect of said on/off signal on said switching means when said current flowing from said secondary winding to said first transformer exceeds a threshold.

15. The system of claim 14, wherein said first control means limits the on time of said switching means to limit the peak value of said current flowing from said secondary winding of said first transformer to said first winding of said second transformer.

16. The system of claim 14, comprising unidirectional conducting means for coupling said secondary winding of said first transformer to said first winding of said second transformer.

17. The system of claim 1, further comprising:

a derived secondary supply, coupled to said second transformer, for generating an ultor voltage for a cathode ray tube;
means for generating a second feedback signal indicative of said ultor voltage; and,
second control means responsive to said second feedback signal for controlling the effect of said on/off signal on said switching means when said ultor voltage exceeds a threshold.

18. The system of claim 17, wherein said second control means interrupts propagation of said on/off signal to block operation of said switching means.

19. The system of claim 17, further comprising means for sensing current conducted by said switching means and generating a third feedback signal, one of said first and second control means also being responsive to said third feedback signal.

20. The system of claim 15, further comprising:
means for sensing current conducted by said switching means and generating a second feedback signal; and,
second control means responsive to said second feedback signal for controlling the effect of said on/off signal on said switching means when said current conducted by said switching means exceeds a threshold.

21. A power supply for a television, comprising:
a transformer having a plurality of windings;
on/off switching means responsive to an on/off signal for regulating a supply voltage responsive to a voltage regulation feedback signal by enabling conduction of an energizing current into a first one of said windings;
first sampling means for generating a first overload feedback signal indicative of said energizing current into said first one of said windings;
a first safety circuit responsive to said first overload feedback signal for controlling the effect of said on/off signal on said switching mans in a first manner when said energizing current exceeds a first threshold;
means coupled to a second one of said windings for generating an ultor voltage for a cathode ray tube;
second sampling means for generating a second overload feedback signal indicative of said ultor voltage;
a second safety circuit responsive to said second overload feedback signal for controlling the effect of said on/off signal on said switching means in a second manner when said ultor voltage exceeds a second threshold;
third sampling mans for generating a third overload feedback signal indicative of current through said switching means; and,
one of said first and second safety circuits also being responsive to said third overload feedback signal for controlling the effect of said on/off signal on said switching means when current conducted by said switching means exceeds a third threshold.

22. The power supply of claim 21, wherein said first safety circuit controls the effect of said on/off signal on said switching means in said first manner by limiting the on time of said switching means to limit the peak value of said energizing current.

23. The power supply of claim 21, wherein said second safety circuit controls the effect of said on/off signal on said switching means in said second manner by interrupting propagation of said on/off signal.

24. The power supply of claim 22, wherein said second safety circuit controls the effect of said on/off signal on said switching means in said second manner by interrupting propagation of said on/off signal.

25. The power supply of claim 21, further comprising a second transformer having a primary winding coupled to said switching means and coupled to a voltage source and having a secondary winding coupled to said first one of said windings of said first transformer, said energizing current flowing from said secondary winding of said second transformer to said first one of said windings of said first transformer.

26. The power supply of claim 25, further comprising a deflection yoke coupled to said first one of said windings of said first transformer and coupled to said switching means.

27. The power supply of claim 21, further comprising a deflection yoke coupled to said first one of aid windings and coupled to said switching means.

28. The power supply of claim 25, further comprising unidirectional conducting means for conducting said energizing current from said secondary winding of said second transformer to said first one of said windings of said first transformer.

* * * * *